US012731462B2

(12) United States Patent
Avtsen

(10) Patent No.: US 12,731,462 B2
(45) Date of Patent: Sep. 8, 2026

(54) RAPID BETTING PLATFORMS AND METHODS

(71) Applicant: GLADUS LLC, Chicago, IL (US)

(72) Inventor: Oleg Avtsen, Tel Aviv Jaffa (IL)

( * ) Notice: Subject to any disclaimer, the term of this patent is extended or adjusted under 35 U.S.C. 154(b) by 246 days.

(21) Appl. No.: 18/643,011

(22) PCT Filed: Oct. 27, 2021

(86) PCT No.: PCT/US2021/056765
§ 371 (c)(1),
(2) Date: Apr. 23, 2024

(87) PCT Pub. No.: WO2023/075757
PCT Pub. Date: May 4, 2023

(65) Prior Publication Data
US 2025/0232648 A1 Jul. 17, 2025

(51) Int. Cl.
*G07F 17/32* (2006.01)
*G06Q 50/34* (2012.01)

(52) U.S. Cl.
CPC ......... *G07F 17/3288* (2013.01); *G06Q 50/34* (2013.01); *G07F 17/323* (2013.01)

(58) Field of Classification Search
CPC .... G07F 17/3288; G07F 17/323; G06Q 50/34
See application file for complete search history.

(56) References Cited

U.S. PATENT DOCUMENTS 7,819,742 B2 * 10/2010 Chamberlain ........... G07G 5/00 463/16
2008/0171588 A1 * 7/2008 Atashband .......... G07F 17/3232 463/20
2012/0115585 A1 * 5/2012 Goldman ........... G07F 17/3272 463/25
2013/0116032 A1 * 5/2013 Lutnick ............... G07F 17/3279 463/25
2017/0249801 A1 * 8/2017 Malek ................. G07F 17/3255
2018/0261046 A1 * 9/2018 Chun .................. G07F 17/3293
2018/0315276 A1 * 11/2018 Persson ............... G07F 17/3209
2020/0228941 A1 * 7/2020 Angapova ............ G06Q 10/107
2020/0333925 A1 * 10/2020 Jung ...................... G06F 3/0482
2021/0327221 A1 * 10/2021 Masui ................. G07F 17/3211

* cited by examiner

*Primary Examiner* — James S. McClellan
(74) *Attorney, Agent, or Firm* — Boris Leschinsky

(57) ABSTRACT

A rapid betting platform is configured to allow rapid adjudication of each bet by others by a single motion, signifying at least one or an acceptance or rejection of the bet. Bet replication may be done using a single action, such as swiping the bet record card in a predefined direction. Using a single action to accept or reject bets of others allows the user of the platform to rapidly place a large number of bets in a short period of time.

20 Claims, 10 Drawing Sheets

RAPID BETTING PLATFORMS AND METHODS

CROSS-REFERENCE DATA

This application claims a priority date benefit from an international patent application No. PCT/US21/56765 filed on 27 October 201 with the same title, which is incorporated herein by reference in its entirety.

BACKGROUND

Without limiting the scope of the invention, its background is described in connection with remote and online betting. More particularly, the invention describes a rapid betting platform where users have an opportunity to rapidly place replicating bets to copy that of other users.

Betting on sports and other events is a multi-billion-dollar business. Casinos, for example, have large sports and event betting parlors for attracting bettors. These parlors display the bets that a person may make on various sporting or types of events. Large displays are typically used to inform the players of a multitude of events and current bets. Information on these displays is constantly changing to reflect changing bets. Bets may be placed on most major sports, including professional and college football, soccer, baseball, basketball, auto racing, and ice hockey, as well as cricket and rugby. Further, bets may be placed on various sports tournaments, including the NCAA Men's and Women's Basketball Championships and World Cup Soccer. Also, bets may be placed on other types of events with multiple possible outcomes, including, for example, a selection of the winner of a reality television show (e.g., the Survivor reality show), election results, weather events, the winner of the next United States Presidential election, or any other type of event.

In general, gambling is understood as wagering, or betting, of money or something of material value (also referred to as "the stakes") on one or more projected outcomes of an event with an uncertain outcome with the primary intent of winning additional money and/or material goods. Typically, the outcome of the wager, or bet, is evident within a short period of time.

A variety of betting arrangements are known in the field, such as fixed odds betting and parimutuel betting, which frequently occur at many types of sporting events, and political elections. In addition, many bookmakers offer fixed odds on a number of non-sports-related events, for example, the direction and extent of movement of various financial indices or election results. Interactive prediction markets also offer trading on these outcomes, with "shares" of results trading on an open market. One of the most widespread exemplary forms of non-sports gambling involves betting on horse or dog racing.

The Internet and the increasing availability of broadband services have led to the expansion of local betting to include remote users or bettors (these two terms are used herein interchangeably), giving rise to a proliferation of online betting and gambling. In general, to participate in online gambling activities, such as placing bets on the projected outcomes of sporting events, a user must open an account with an online betting platform, which typically includes a deposit or credit account. Once the user's account is open, validated, and funded, the user may participate in online betting activities using the funds or balance available in his or her account. Over time, the user may deposit additional funds into or withdraw funds from his or her account.

To establish an account with an online betting platform, a user typically completes an account application, which must be approved by the online betting platform administrator. For a deposit account, the user typically completes an online account application and funds the account through a credit card transaction with the betting platform or by physically mailing a check, cash, or similar payment to the betting platform. For a credit account, the user may be required in some cases to mail particular items, such as a credit card or bank statement, for example, to the online betting platform in order for the betting platform administrator to determine whether to approve the account application.

It is reasonably easy to follow just a few events when betting online. However, once the number of possible betting events increases, a typical user may have a tough time understanding all the details of betting on an individual event given a broad variety and a rapid succession of updates accompanying each event. In addition, studying each of the available events and their possible outcomes is a time-consuming process, which limits the ability of a user to place many bets in a short period of time. One way to resolve this difficulty is to allow that user to replicate bets by others, especially those that the user trusts or follows.

The need exists, therefore, for a betting platform that is configured to service both types of users: those who prefer to make their own original bets, as well as those who may elect to join other bettors and copy their bets for themselves, replicating at least some or all of the details and conditions of the bets created by other users.

SUMMARY

Accordingly, it is an object of the present invention to overcome these and other drawbacks of the prior art by providing a novel betting platform accessible to a variety of users with different user preferences.

It is another object of the present invention to provide a betting platform that allows rapid placement of multiple bets in a short period of time.

It is another object of the present invention to provide a betting platform allowing placement of individual bets with a single motion, gesture, or another single input by the user.

A rapid betting platform of the present invention may include a server accessible via an electronic communications network such as the Internet by a plurality of registered users via their respective electronic user devices. The platform server may include a controller operating at least one or more electronic computer processors, as well as a memory with at least one database.

As contrasted to the prior art, the present invention is advantageous in that the controller is operatively interacting with the plurality of electronic user devices associated with individual users, wherein each electronic user device may be configured for executing the following steps:

a. receiving an individual user-configured stream of bet records by other users, b. presenting each received bet record to the individual user one at a time, thereby inviting the individual user to either accept or reject the same bet for themselves, and c. responding to a single action input from the individual user by:

A. communicating to the server of the acceptance or rejection by individual user of the currently presented bet record, B. archiving the currently presented bet record, and C. presenting the next bet record of the stream of bet records for adjudication by the individual user.

Importantly, the user-configured stream of bet records consists of two streams of bet records. The first stream of bet records may include all or the individual user-selected subset of public bet records by other users. In embodiments, each public bet record is characterized by an original public bet by another user and previous replications thereof, if any, by other users of the rapid betting platform. To create an original public bet, another user may select at least one projected outcome of a selected event, bet a first wage on the selected at least one projected outcome, and designate the bet as public and visible to all users of the betting platform.

The second stream of bet records may comprise all or the individual user-selected subset of private bet records. Similar to public bet records, each private bet record is characterized by an original private bet by yet another user and previous replications thereof, if any, by other users of the rapid betting platform. To create a private bet, another user may select at least one projected outcome of a selected event, bet a second wage on the selected at least one projected outcome, and designate the bet as private and visible to only one or a group of other users of the betting platform, as defined by the creator of the original private bet. This group may include the individual user, in which case the private bet will be presented to the individual user as well.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through the use of the accompanying drawings, in which:

DETAILED DESCRIPTION OF PREFERRED EMBODIMENTS OF THE INVENTION

Figure 1:
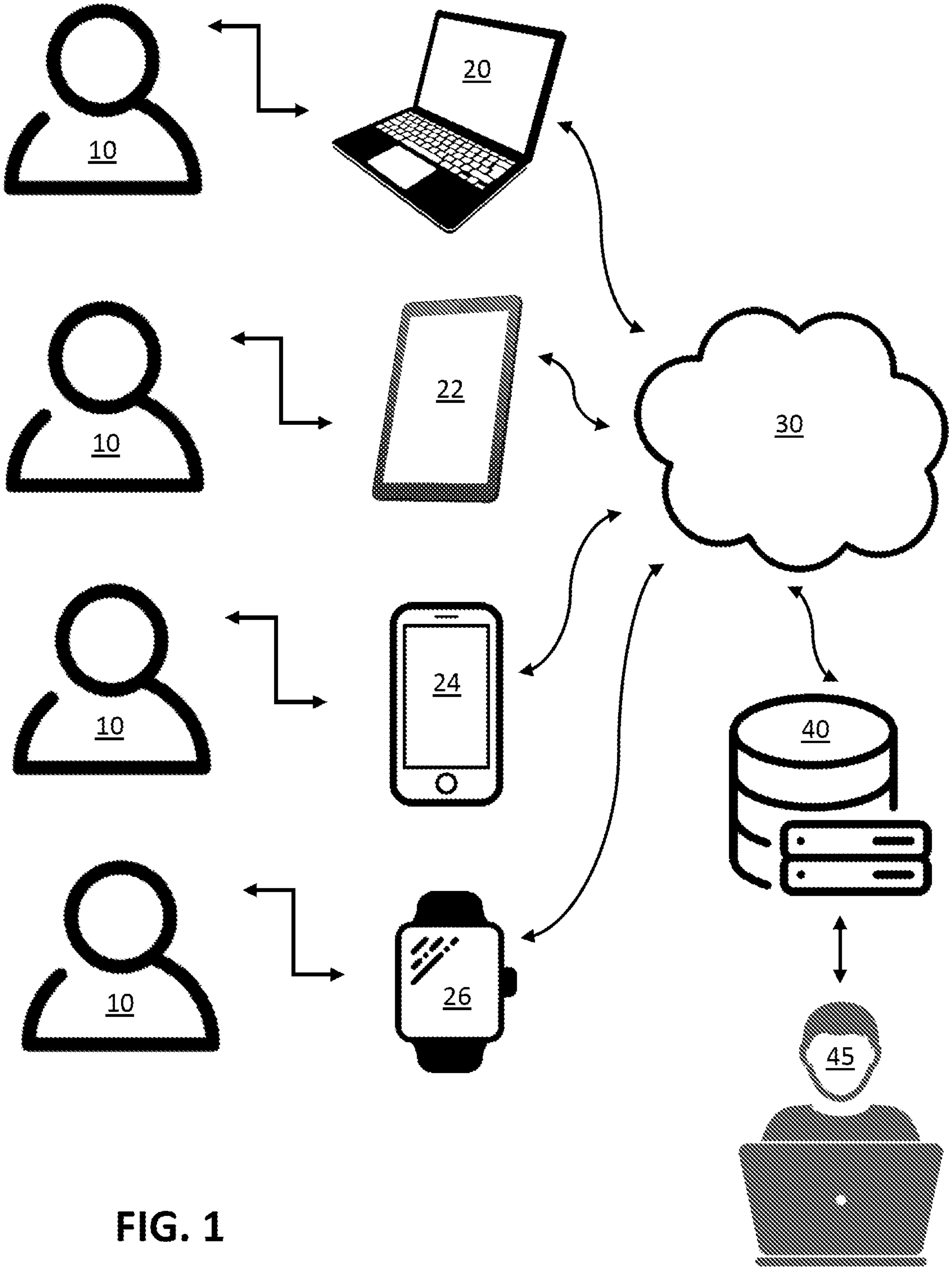
FIG. 1 is a schematic view of the betting platform's general architecture.

The present invention will now be described in detail with reference to a few preferred embodiments thereof, as illustrated in the accompanying drawings. In the following description, numerous specific details are set forth in order to provide a thorough understanding of the present invention. It will be apparent, however, to one skilled in the art that the present invention may be practiced without some or all of these specific details. In other instances, well-known process steps and/or structures have not been described in detail in order to not obscure the present invention.

One or more different inventions may be described in the present application. Further, for one or more of the invention (s) described herein, numerous embodiments may be described in this patent application and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical, and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only and are not to be taken as limiting the disclosure in any way.

Devices that are in communication with each other need not be in continuous communication with each other unless expressly specified otherwise. In addition, devices that are in communication with each other may communicate directly or indirectly through one or more intermediaries.

A description of an embodiment with several components in communication with each other does not imply that all such components are required. On the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of more than one device or article.

The functionality and/or the features of a device may be alternatively embodied by one or more other devices that are not explicitly described as having such functionality/features. Thus, other embodiments of one or more of the invention(s) need not include the device itself.

FIG. 1 shows a general view of the novel betting platform of the present invention. The betting platform is based on a controller 40 accessible via an electronic communication network 30 by a plurality of users 10 via their respective electronic user devices 20, 22, 24, and 26. Users 10 may be individual persons, bookmakers, other betting dealers, or other individuals or groups who are interested in participating in the betting process facilitated by the betting platform of the present invention. The platform administrator 45 may also act as a registered user. In further embodiments, Artificial Intelligence bots may also function as registered users on the betting platform, as the invention is not limited in this regard.

Each user may go through a one-time user registration process setting us a user account, log-in information, and user preferences, such as filters as described below in greater detail. The user may then be allowed to fund the account with an initial amount of money using preferred or multiple currencies as set by the platform administrator 40.

The electronic communication network 30 may be organized using wired communications, wireless communications, or a combination thereof, as the present invention is not limited in this regard. FIG. 1 shows the electronic communications network 30 as the Internet, but other arrangements are also contemplated to be covered by the scope of the claims of the present invention. Examples of additional arrangements not shown in the drawings include intermediate ISP (internet service providers), home-based networks, cellular networks, etc., as the invention is not limited in this regard. Preferably, all wireless communication is conducted using a variety of known secure transmission protocols so as not to jeopardize the interests and personal data of registered users.

A variety of electronic user devices may be used in conjunction with the present invention. Examples of such devices include personal computers and laptops 20, tablets 22, smartphones 24, smartwatches 26, etc. Advantageously, but not necessarily, such devices may include a touch-sensitive display, which allows for rapid betting by a single touch action, such as swiping, as explained below in greater detail. Each electronic user device may be configured to facilitate a log-in process by a registered user 10. Upon logging in, the electronic user device may be configured to display user-configurable information suitable for the individual user 10.

In embodiments, it may be advantageous to maintain a continuous wired or wireless connection between the electronic user device and the server 40-so as all relevant betting updates are rapidly transmitted as notifications to the user and all betting actions by the user are rapidly transmitted to the server 40 for registration, vetting and further disposition. In other embodiments, the intermittent connection between the electronic user device 20 and the server 40 may still be permitted, given that the bet is received on time and prior to the expected outcome of the event being known and communicated to other users.

Server 40 may comprise one or more individual controllers operating one or more electronic computer processors. The server 40 may further include one or more memory units housing one or more databases configured to store a roster of registered users, a roster of events, and other pertinent information necessary for the operation of the betting platform of the present invention. The server 40 may be operated and monitored by the platform administrator 45.

In embodiments, information about events and bets based on these events may be generated by the server 40. In other embodiments, such information may be transmitted by other bookmakers and betting dealers, in which case the server 40 may be configured to aggregate betting information from one or several other sources. The server 40 may further be configured to present betting information to the users 10 in a single unified manner as described, for example, in our other co-pending patent applications in greater detail.

The betting platform described herein is advantageous as compared to other known betting platform for a number of reasons, mainly because it allows for rapid replication of original bets by other users and therefore provides an opportunity for many people to place a large number of bets in a short period of time. One example of this process is schematically illustrated in FIG. 2.

Figure 2:
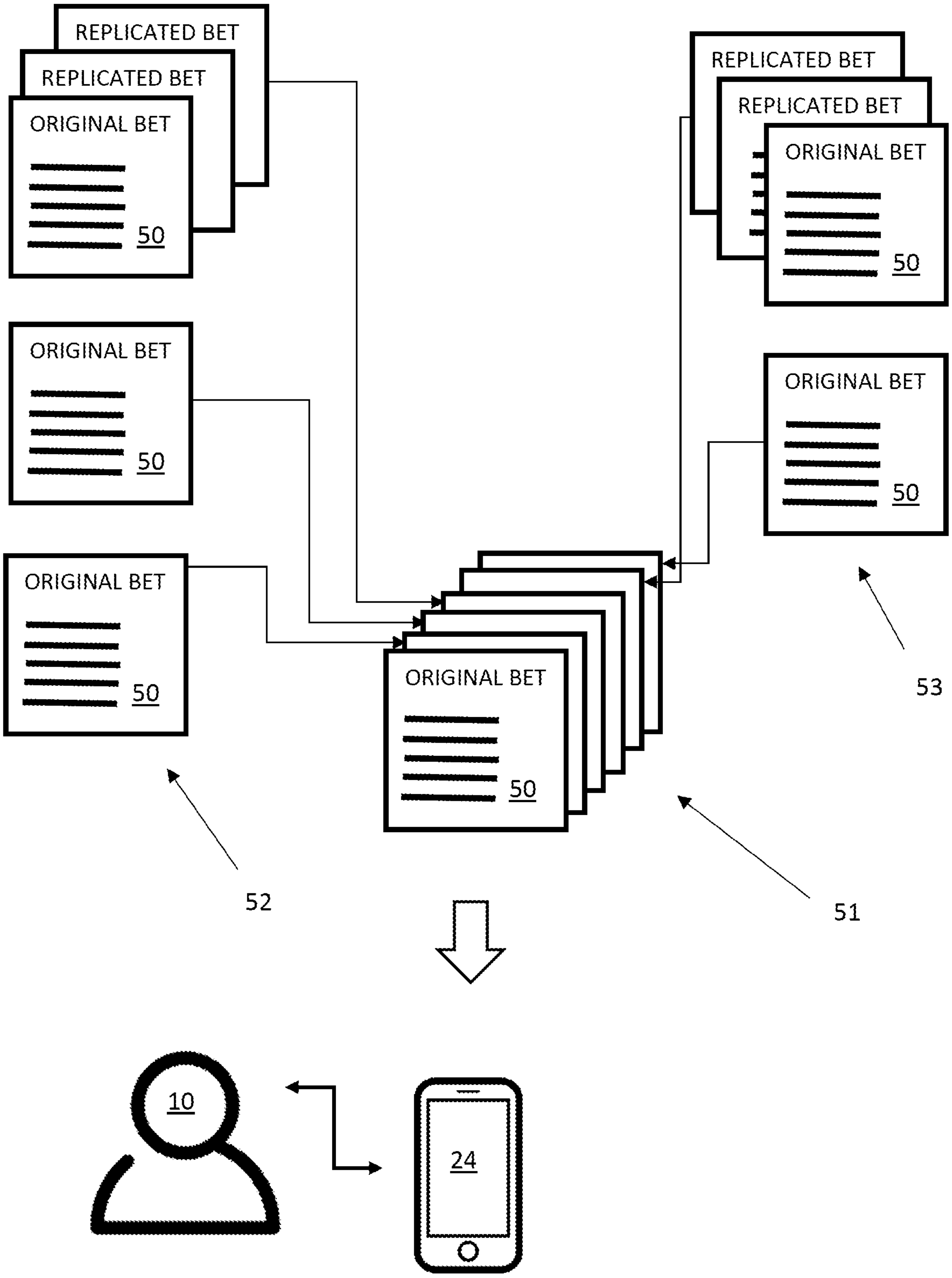
FIG. 2 is a schematic illustration of the stream of bet records presented to the individual user of the betting platform.

Shown in FIG. 2 is a typical user 10 operating an electronic user device 24 connected to the betting platform as described above. The individual user 10 may be presented with a stream 51 of bets 50 made by other users of the platform. Two types of bets by others may be combined into a single stream 51 and presented to the user 10 soon after they are validated and accepted by the platform: public bets 52 and private bets 53.

An original bet, in general, may be created by another user and specify at least one selected event, at least one or more of the projected outcomes of the selected event, and a wage the other user placed on the selected outcome. Once the bet is created, a user may have an opportunity to designate the bet as either public or private. In case of a public designation, the bet is visible to all users of the betting platform. A private designation specifies one or more other users of the platform who are notified and given an opportunity to view the original bet by that user.

Given the two types of bets as described above, the individual user 10 may be notified about all public bets as well as all private bets by others that include the individual user 10 in the list of private observers. This notification may occur in real-time or shortly after validation and acceptance of other bets by the betting platform of the present invention.

In further embodiments, the individual user 10 may be notified about bets by others even before they are formally accepted by the server, in which case this information may be presented to the user as a record of a bet in a draft form. Knowing that other users are drafting their bets may provide the individual user 10 with an additional information advantage by anticipating that other bets will be accepted and formally validated from their initial draft status.

User 10 may further have the option to view all the public bets 52 and available to this user private bets 53. One or more filters may also be provided to the user 10 to limit the stream of incoming bet records to only those that fit user-specified criteria. In one example of such a filter, the individual user 10 may elect to view bets from selected other users of the platform. In another example, individual user 10 may elect to view bets only for a certain type of events, such as games in one particular sport or another. In a further example, the individual user 10 may select to view only events with outcomes slated for a certain period of time, such as during the present day or during the present week. In other yet examples, the user 10 may elect to view only events with wages within a certain predetermined limit, and so on.

User-adjusted filters may be organized to apply to either public bets or private bets. In further embodiments, individual filters may be applicable to all bets, both private and public as the invention is not limited in this regard.

The incoming stream of bets 51 may include information about not only the original public and private bets but also about any bet replications that may have been made by other users of the platform, which may inform the individual user 10 about betting activity of others with regard to one selected event or another.

The electronic user device 24 may be further configured to allow the user to rapidly adjudicate the top bet record with a single action, such as replicate it for themselves, adjust the wage amount, reject the bet, like the bet for coming to it at a later time, etc. as described below in greater detail. Once the top bet is adjudicated, the electronic user device 24 may be further configured to: (A) communicate to the server 40 of the acceptance or rejection by individual user 10 of the currently presented bet record, (B) archive the currently presented bet record, and (C) presenting the next bet record 50 of the stream of bet records 51 for adjudication by the individual user 10.

Each bet record presented to the user may be updated from time to time or in real-time to reflect additional bets placed by other users. The individual user 10 may further be provided with an option to review the most current bet information for the selected events after they were initially presented to reflect the most current updates.

While it may be convenient for the individual user to view the stream of bet records as a stack-up of individual record cards, other methods of presenting a plurality of bet records are also contemplated by the present invention. The card stack-up may be convenient for a user when the electronic user device 24 has a small screen, such as a smartphone or a tablet. For users with large screens or electronic user devices equipped with multiple screens and displays, a plurality of bet records may be resented as a matrix of bets so more than one bet record may be fully viewed at the same time.

The betting platform may be operated to continuously accept various original and/or replicated bets from multiple users of the platform and notify other users associated with the same event until a certain cut-off point, for example, a predefined time or a predefined state of the event. Typically, respective users are informed as to the cut-off point in advance, so they have an ample chance to make their bets. One example of a cut-off state of the event may be a start of a horse race or, in other examples, a finish of a horse race. Typically, all bets are collected well before there is a determination of the specific outcome of the event.

Once the event outcome has been determined, server 40 may be configured to determine the outcome of each placed bet on that event and to determine a monetary remuneration to be transmitted to the accounts of the winners. All users who placed a bet in a certain event may be notified about the actual outcome thereof and the disposition of their bets.

One further example of such limits that may be set in the "other settings" tab on the user interface screen is selecting a cumulative maximum wagering amount, which is not to be exceeded. This limit may apply to a certain time period, for example a "not to exceed" limit of bets per day or per week. In that case, no additional rapidly replicated and/or original betting may be allowed upon the user reaching the pre-defined cumulative wagering amount.

The betting platform may be further configured to allow the user to see a history of all placed bets by that user as well as a history of all transactions involving the user's account. In other embodiments, a user may be given an option to see several or all of his/her current bets and their respective status. In further embodiments, record cards associated with each accepted bet may be sorted by the time of expected receipt of the event outcome so that the record cards with the events closer to their respective outcome are shown on top of record cards with bets that will be adjudicated at a later time.

In addition to adjudicating incoming bet records as described above, the electronic user device may be further configured to allow the user 10 to create an original bet of their own by selecting at least one event, at least one projected outcome of the event, a wage amount placed on the at least one selected projected outcome and designating the bet as public or private. In further embodiments, the "settings" tab for the user may be adjusted to only present the user with certain types of events available for betting, such as certain sports. The "settings" tab may further allow the individual user 10 to select a default wage amount that will be placed on each bet unless it is individually adjusted prior to finalizing the bet.

FIGS. 3-10 depict exemplary screenshots of various aspects of the operation of the single electronic user device, which are now described in greater detail. The form factor of each screen shown in FIG. 3-10 are illustrative of a form factor optimized for a smartphone display. Other form factors are certainly known as best fitting other electronic devices and are intended to be used for the purposes of the present invention.

Figure 3:
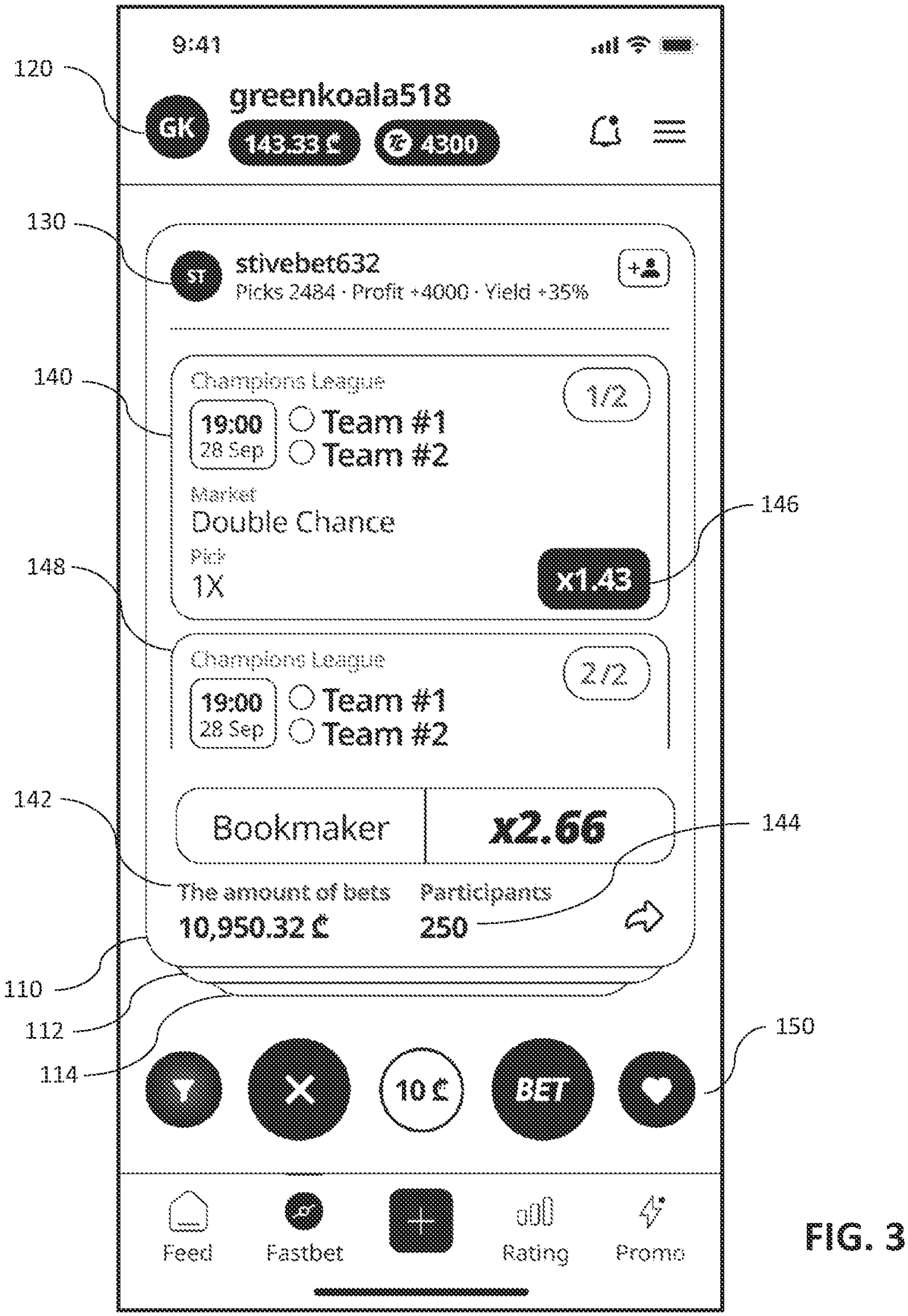
FIG. 3 is an exemplary screen view of a home screen for a user showing a stack-up of the plurality of bet record cards of various bets by other users.

FIG. 3 is an exemplary screen view of a home screen for a user showing a top card for a stack-up of the plurality of bet record cards 110, 112, 114 of various bets by other users. The home screen may also contain the screen name of the user and/or its short abbreviation 120. Each bet record card of the initial stack-up of cards may be first presented in a compressed form showing only a summary of the event and other bet data, such as a panel 140, for example, the screen name of another bettor 130, the time and the nature of the event 140 that the other bettor 130 is betting on, current decimal odds 146, the total amount of all bets on this events 142, the number of bettors for this event 144 and other information as determined by the platform administrator.

Figure 8:
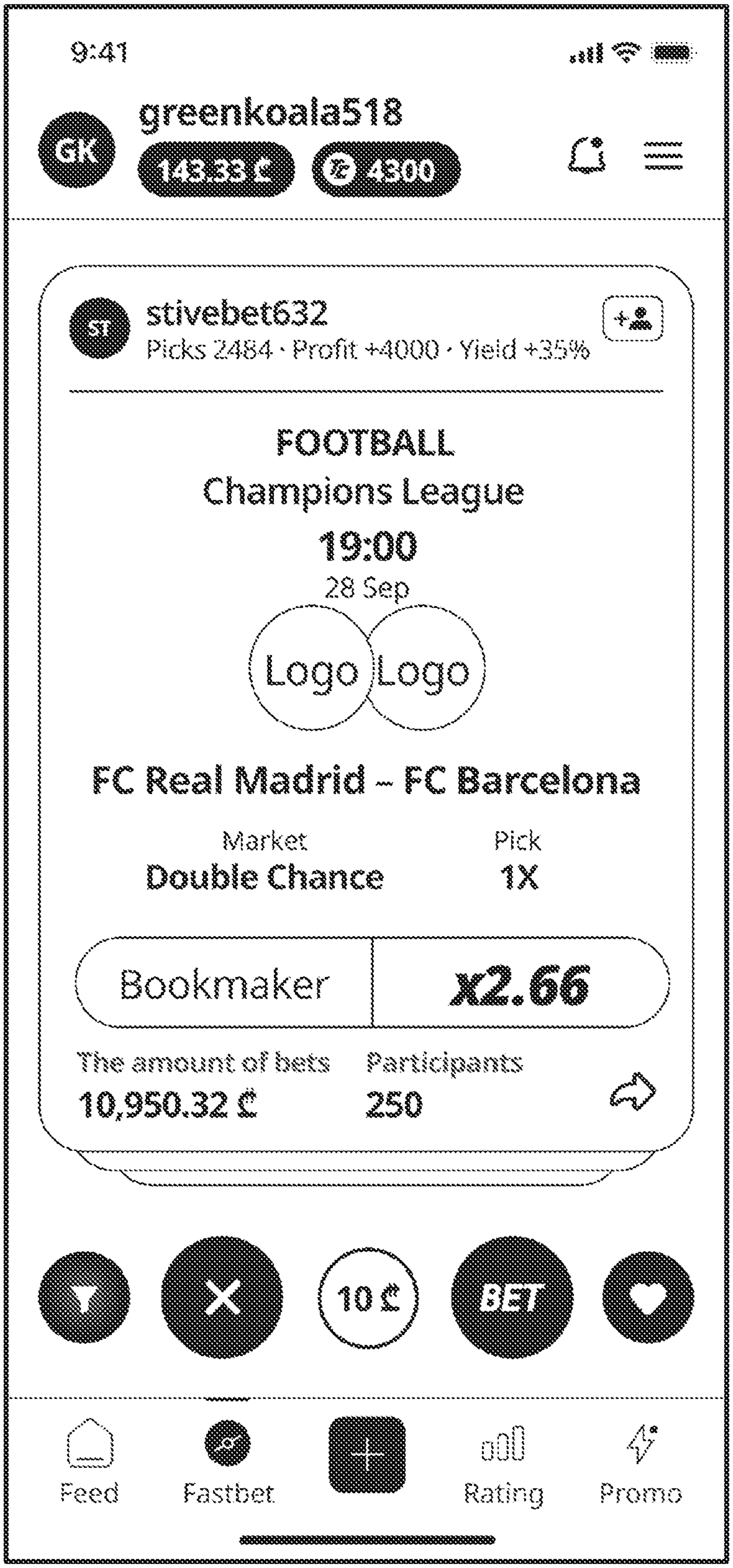
FIG. 8 is an exemplary screen view of the record card reflecting a single event only.

A single user may place more than one original bet on the same or different events. The home screen may present all of the various original bets of the same single user (stivebet632 in the example seen in FIG. 2) as a number of several panels. In this example, the user can see two panels: panel 140 (panel one of two) and panel 148 (panel two of two). In contrast to FIG. 2, FIG. 8 shows an example of a single panel record bet presented on a home screen for the user. In embodiments, one record card may contain information for one or more events. Alternatively, one record card may contain information for the same event, which may have a plurality of possible projected outcomes or combinations of projected outcomes.

Various currency units may be used for the betting purposes of the platform of the present invention. The server 40 may be configured to accept a local currency, such as a total pool of 10,950.32 Georgian lari shown in FIG. 2. The server 40 may be further configured to accept other currency units, such as US dollars, EU euros, etc., and convert other currency into a preferred local currency at a predetermined rate, which may be set daily or adjusted from time to time depending on market conditions. In further embodiments, the server may also be configured to accept one or more types of cryptocurrency, as the invention is not limited in this regard.

Figure 4:
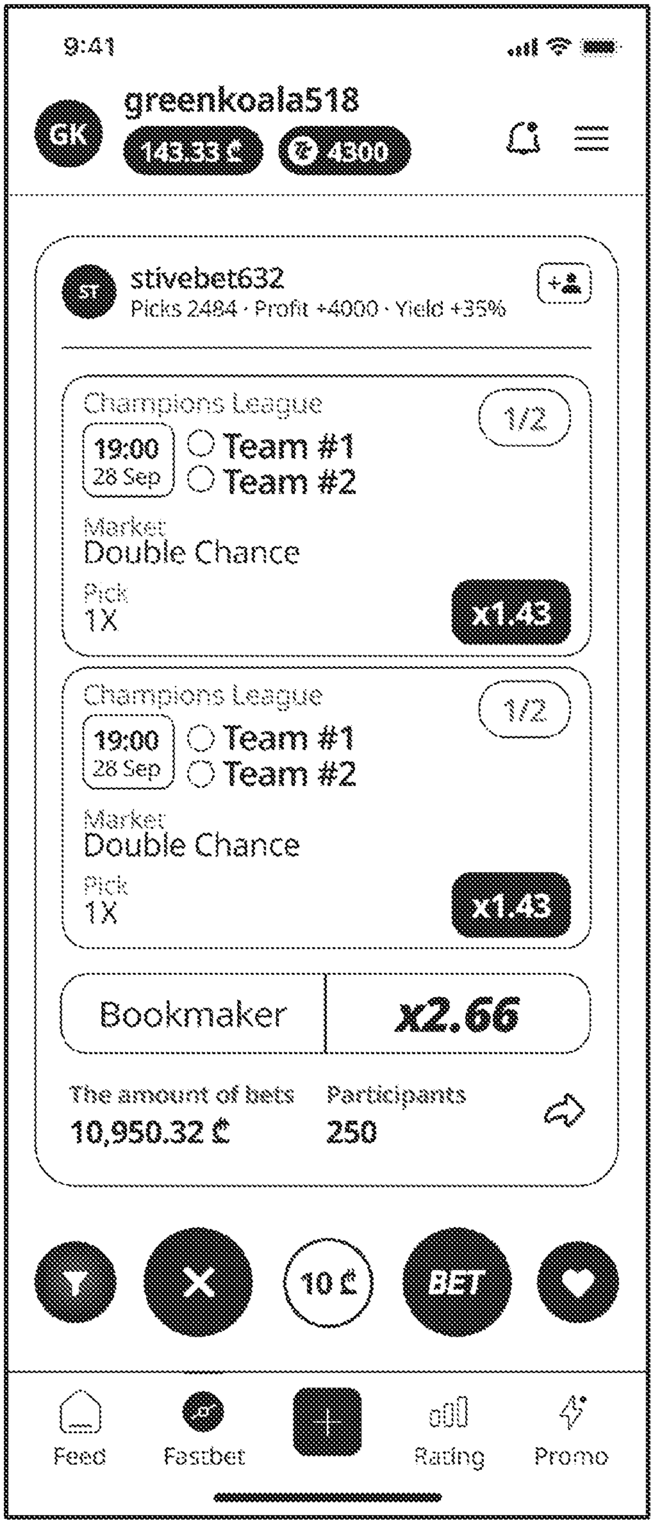
FIG. 4 is an exemplary screen view of the expanded view of the selected record card.
Figure 5:
FIG. 5 is an exemplary screen view of the screen during the swiping of the record card to the right, causing the card to be marked as "like"

The user may have an option to see all data for the expanded bet record card by activating a full view thereof, such as shown in FIG. 4. Such activation may be caused by pressing on the image of the card, or by other common user selection steps.

The home screen of FIG. 3 may also have a panel of action buttons 150, which may include (as shown and described from left to right in FIG. 2): a button for activating one of more filters for selecting the type of bet record cards the user wants to see in his update feed, a REJECT BET button, a CHANGE BET button, an ACCEPT BET button, a LIKE BET button and others. For example, clicking on the LIKE BET button may cause the bet to be placed in a separate stack-up of bets that the user likes and would consider for betting at a later time. Clicking on the LIKE BET button may result in the removal of the top bet record card from the home screen and a display of a confirmation for a LIKE BET designation, which is seen in greater detail in FIG. 5.

Figure 6:
FIG. 6 is an exemplary screen view of the same, but in this case, swiping to the right causes the record card to be replicated as a bet from the user.

One key advantage of the betting platform of the present invention is the ability to instantly place or reject a proposed bet with a single action. In one non-limiting example, swiping the bet record card in one predetermined direction may automatically cause the action of placing a replicating bet by the user, as illustrated in FIG. 6. In the same example, swiping the record card in another direction may be configured to cause the user interface to reject the bet for the user.

In addition to this rapid binary disposition of a proposed bet (Accept/Reject) using a single action, in this example, swiping the record card to the left or the right, an additional single action may be used for further possible actions, such as designate the bet record card as LIKE BET card.

A single action rapid betting is not limited to the swiping action of the record card off the screen. Other examples of a single gesture, voice command, or another single action may also be used for rapidly accepting or rejecting bets of others. One example is a voice recognition feature that may be configured to recognize ACCEPT or REJECT voice commands for a respective further action. Other similar voice commands may also be included in the list of recognized commands, for example YES and NO, etc. Similar commands in other languages may also be included as part of the operation for a typical user interface of the present invention.

In further yet example, a video camera on the smartphone or a tablet of the electronic user device may be configured to recognize a single motion or a user's head for at least a binary command input. For example, nodding of a head may be recognized as an ACCEPT BET command, while turning the head left and right may be recognized as a REJECT BET command. Similarly, suitable hand gestures may also be recognized by the video camera of the electronic user device as input for at least a binary disposition of a proposed bet.

Moreover, a user may be given the option to provide a custom personalized gesture or action for accepting or rejecting a bet, such that the invention is not limited in this regard.

Once the top bet record card is decided upon by the user, the user interface may be configured to automatically remove the top bet record card from the home screen and present the next record card to the user. Using a single action for accepting or rejecting a top proposed bet on a home screen can advantageously allow the user to place a large number of replicating bets in a very short period of time.

Figure 7:
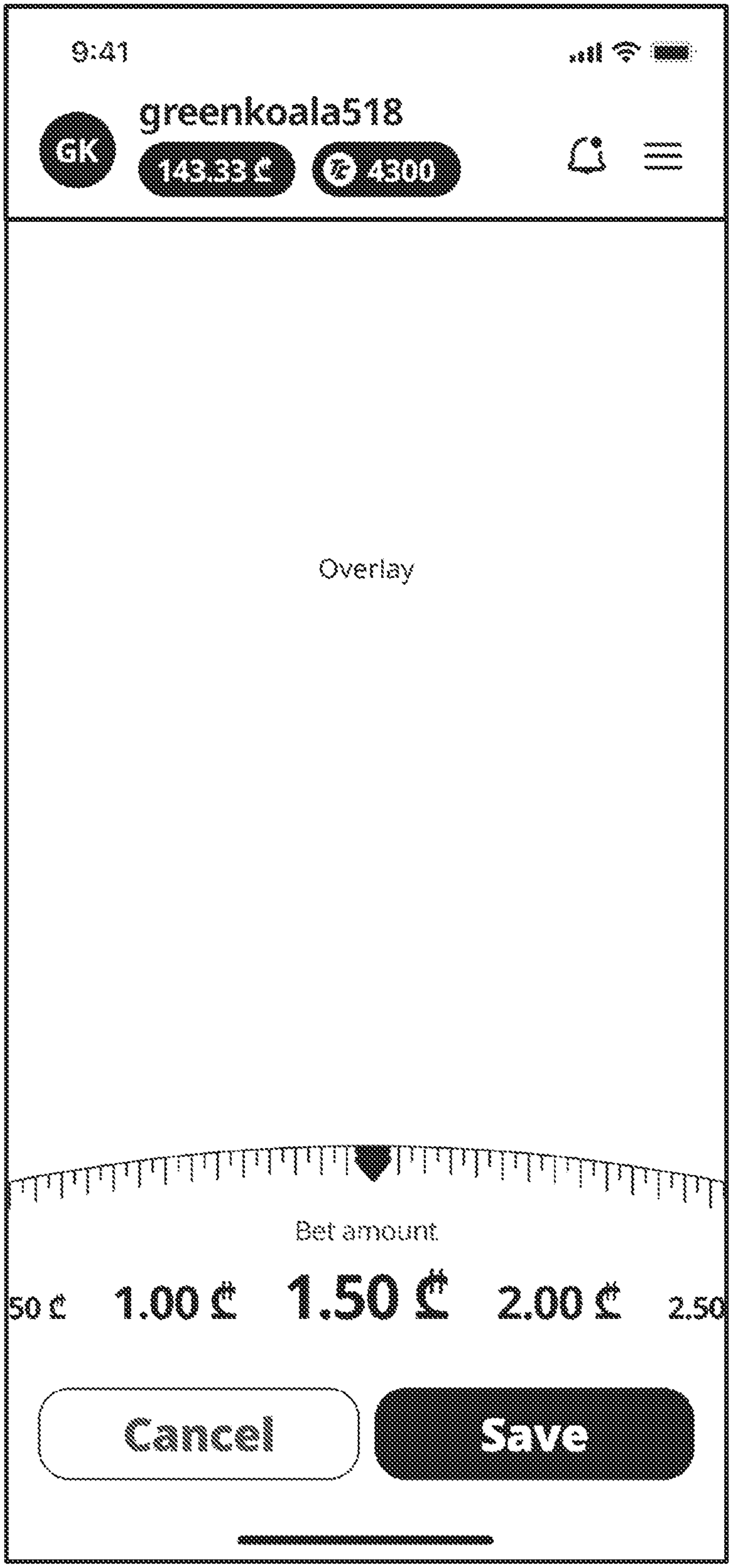
FIG. 7 is an exemplary screen view of the wage adjustment portion of the record card upon selection thereof by the user.

The user interface of the present invention may be more flexible than simply facilitating accepting or rejecting the same bet placed by others. In embodiments, the user may be provided with an opportunity to adjust the wagering amount for the bet that is of interest to the user. Clicking on ADJUST BET button, or in other examples double clicking on the record card may bring a dial for wagering amount adjustment, as illustrated in FIG. 7. The user may then increase or decrease the wagering amount as best suitable for his/her individual purposes. Such adjustments may be done in increments and/or within limits set by the platform administrator 45.

Figure 9:
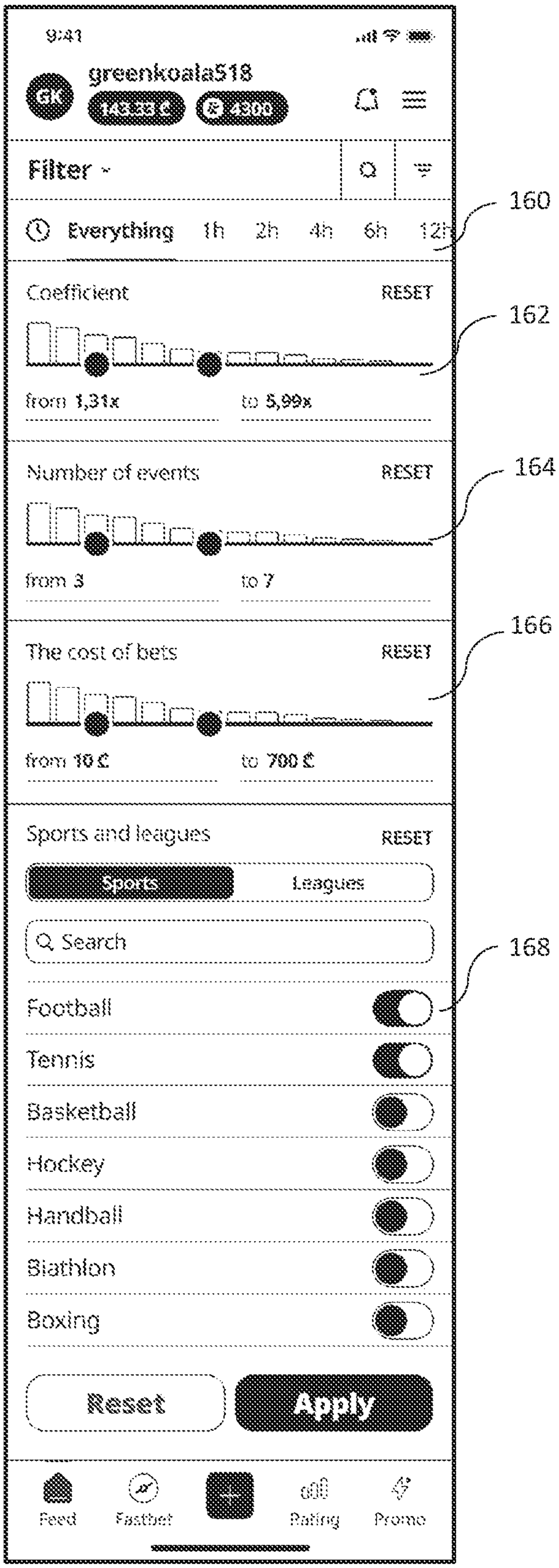
FIG. 9 is an exemplary screen view of all the filters available to the user.

The betting platform of the present invention may be configured with a great deal of flexibility and adjustability by individual users as to what each user likes to be notified about and see other bets for. FIG. 9 shows an example of various filters that may be user-adjustable to select different events and different bets as preferred by the user. In one example, the user may select to be notified only about events 160 with the outcome to be resolved in a specified period of time, such as within 1, 2, 3, 4, 5, 6, 8, 10, 12, 16, 18, 20, 22, 24 hours, or, in other examples, within 1, 2, 3, 4, 5, 6, 7, 8, 9, 10, 12, 14, 16, 18, 20, 22, 24, 26, 28, 30, 31 days, as the invention is not limited in this regard.

In a further example, the user may select only bets and events filtered by an adjustable value of min and max coefficient 162.

In a further example, the user may select to only see a limited number of events 164.

In a further yet example, the user may select to only see bets within a specified range 166.

In a further yet example, the user may select to see only events and corresponding notifications for certain sports 168, and/or certain leagues within each selected sport. Other similar user-adjusted filters may also be provided by the platform administrator 45 to the user and changed from time to time to make them best suited for the current circumstances.

Figure 10:
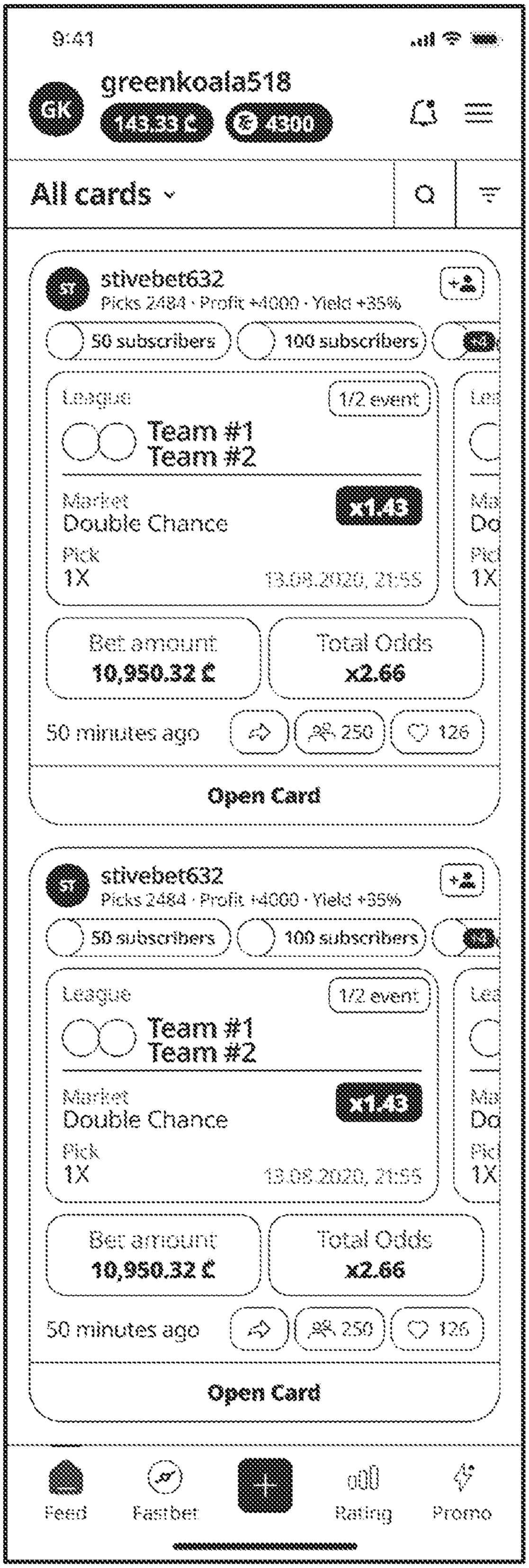
FIG. 10 is an exemplary screen view of an alternative way to view the feed of updated and/or newly created record cards to the user.

Finally, FIG. 10 shows an alternative way to display various updated bet record cards to the user. In contrast to the stack-up of record cards in FIG. 3, FIG. 10 shows an example of a continuous feed of updated bet record cards for various events, as may be limited by the user using filters described above. Each record card may include a timestamp of the last change. The user may rapidly replicate or reject the bet using a single action as described above in greater detail or elect to see more information by selecting a particular bet record card of interest and clicking an OPEN CARD button.

It is contemplated that any embodiment discussed in this specification can be implemented with respect to any method of the invention, and vice versa. It will also be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference. Incorporation by reference is limited such that no subject matter is incorporated that is contrary to the explicit disclosure herein, no claims included in the documents are incorporated by reference herein, and any definitions provided in the documents are not incorporated by reference herein unless expressly included herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic (s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12, 15, 20 or 25%.

All of the devices and/or methods disclosed and claimed herein can be made and executed without undue experimentation in light of the present disclosure. While the devices and methods of this invention have been described in terms of preferred embodiments, it will be apparent to those of skill in the art that variations may be applied to the devices and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A rapid betting platform comprising a server accessible by an electronic communications network by a plurality of registered users via electronic user devices, the server comprising a controller operating at least one processor and a memory with at least one database, wherein each electronic user device is associated with an individual registered user and configured for:

a. receiving an individual user-configured stream of bet records created and placed by other registered users of the rapid betting platform, the user-configured stream of bet records comprising:
   I. all or the individual user-selected subset of public bet records by other registered users, each public bet record comprising an original public bet by another registered user and a replication history of previous replications of said original public bet by yet other registered users of the rapid betting platform, wherein each original public bet is created by said another user selecting at least one projected outcome of a selected event, betting a first wager on said selected at least one projected outcome, and affirmatively designating the bet as public and visible to all registered users of the betting platform, and
   II. all or the individual user-selected subset of private bet records by yet other registered users, each private bet record comprising an original private bet by yet another registered user and a replication history of previous replications of said original private bet by other registered users of the rapid betting platform, wherein each original private bet is created by said yet another user selecting at least one projected outcome of a selected event, betting a second wager on said selected at least one projected outcome, and affirmatively designating the bet as private and visible to only a specifically named individual or a specifically named group of other registered users of the betting platform, including said individual user, b. presenting each received bet record to the individual user sequentially one at a time as a queue of bet record cards, thereby inviting the individual user to at least either accept or reject the same bet as a replicating bet for themselves, and c. responding to a single action input from the individual user by:

A. communicating to the server of the acceptance or rejection by individual user of the currently presented bet record, B. archiving the currently presented bet record in a personal bet history associated with the individual user's account, and C. presenting the next bet record of the queue of bet records for adjudication by the individual user.

2. The rapid betting platform of claim 1, wherein in step (a) the stream of bet records is transmitted in real time as said bet records by other users are validated and accepted by the server.

3. The rapid betting platform of claim 1, wherein in step (a) the stream of bet records is transmitted to the individual user following a step of corresponding bet records by other users being validated and accepted by the server and prior to the outcome of selected event is determined.

4. The rapid betting platform of claim 1, wherein in steps (a) and (b) the server is further configured to update each bet record as further bets of other users on the same selected event are validated and accepted by the server.

5. The rapid betting platform of claim 1, wherein the electronic user device is further configured to provide the individual user with at least one user-adjustable filter to select a subset of all bet records available to the individual user.

6. The rapid betting platform of claim 5, wherein the electronic user device is further configured to provide the individual user with at least one user-adjustable filter to select a subset of all public bet records available to the individual user.

7. The rapid betting platform of claim 1, wherein the electronic user device is further configured to present the stream of bet records as a stack of bet record cards arranged in a queue, each bet record card displaying the username or identifier of the original bet creator, at least one selected event, a record of bets on said selected event, and the number of previous replications of said original bet by other registered users of the platform.

8. The rapid betting platform of claim 7, wherein the single action input to accept or reject the bet comprises swiping the top card off the stack of bet record cards in a first predefined direction to accept the presented bet as a replicating bet by the individual user, or in a second predefined direction to reject the bet, wherein each swipe simultaneously archives the adjudicated card in the individual user's personal bet history and reveals the next card in the queue.

9. The rapid betting platform of claim 7, wherein the bet record card is first presented in a compressed form with a user-activated option to see further details thereof from the expanded form of the bet record card.

10. The rapid betting platform of claim 7, wherein each bet record card is initially presented to the individual user in a compressed form displaying a summary of the selected event, the username of the original bet creator, the current decimal odds, the total amount of all bets on the selected event, and the number of bettors for the selected event, and wherein the individual user can activate an expanded form of the same bet record card to view complete details thereof prior to adjudication.

11. The rapid betting platform of claim 7, wherein a single bet record card presented to the individual user comprises a plurality of panels, each panel representing a separate original bet by the same registered user on the same or on different selected events, such that the individual user can adjudicate multiple bets of a single trusted peer as a single bet record card in the queue.

12. The rapid betting platform of claim 1, wherein the electronic user device is further configured to allow the individual user to adjust the wager amount prior to accepting or rejecting the currently presented bet.

13. The rapid betting platform of claim 1, wherein the electronic user device is further configured to accumulate a record of all bets placed by the individual user and present said record to the user upon demand at a later time.

14. The rapid betting platform of claim 1, further configured to cause the server to notify the individual user as to the disposition of the bet once the outcome of the selected event is known.

15. The rapid betting platform of claim 1, wherein the individual electronic user device and the server are further configured to not accept a bet placed by the individual user if said bet is placed outside of predefined individual user limits.

16. The rapid betting platform of claim 1, wherein the individual electronic user device is user-configurable to adjust a default wager amount applicable to at least some or all of the bet records transmitted to the individual user by the server of the rapid betting platform.

17. The rapid betting platform of claim 1, wherein the individual electronic user device is further configured to allow the individual to create an original bet by selecting an event of interest, selecting at least one projected outcome thereof, betting a wager on said selected at least one projected outcome, and designating the original bet as public or private.

18. The rapid betting platform of claim 1, wherein each bet record presented to the individual user displays the total number of other registered users of the platform who have previously replicated the original bet, thereby providing the individual user with social replication data to inform the individual user's acceptance or rejection decision.

19. The rapid betting platform of claim 1, wherein the server is further configured to transmit to the individual user a notification of a bet record created by another registered user prior to formal validation and acceptance of said bet record by the server, said notification being presented to the individual user as a draft bet record, thereby enabling the individual user to anticipate forthcoming validated bet records and gain an information advantage in adjudicating incoming bets.

20. The rapid betting platform of claim 1, wherein the server is further configured to prioritize the order of bet records presented to the individual user in the queue based on the expected time of the outcome of the selected event associated with each bet record, such that bet records associated with more imminent event outcomes are presented to the individual user earlier in the queue than bet records associated with more distant event outcomes.

* * * * *